US011120279B2

(12) United States Patent
Saez et al.

(10) Patent No.: US 11,120,279 B2
(45) Date of Patent: Sep. 14, 2021

(54) IDENTIFICATION OF DISTRACTED PEDESTRIANS

(71) Applicant: GM GLOBAL TECHNOLOGY OPERATIONS LLC, Detroit, MI (US)

(72) Inventors: Miguel A. Saez, Clarkston, MI (US); Marcus J. Huber, Saline, MI (US); Qinglin Zhang, Novi, MI (US); Lei Wang, Rochester Hills, MI (US); Sudhakaran Maydiga, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 144 days.

(21) Appl. No.: 16/426,566

(22) Filed: May 30, 2019

(65) Prior Publication Data

US 2020/0380273 A1 Dec. 3, 2020

(51) Int. Cl.
| | |
|---|---|
| G06K 9/00 | (2006.01) |
| G06K 9/62 | (2006.01) |
| G06N 20/00 | (2019.01) |
| G06N 7/00 | (2006.01) |
| H04W 4/02 | (2018.01) |
| H04W 4/029 | (2018.01) |
| H04W 4/40 | (2018.01) |
| H04W 4/46 | (2018.01) |
| H04W 4/80 | (2018.01) |

(52) U.S. Cl.
CPC ..... *G06K 9/00805* (2013.01); *G06K 9/00369* (2013.01); *G06K 9/6267* (2013.01); *G06N 7/005* (2013.01); *G06N 20/00* (2019.01); *H04W 4/40* (2018.02)

(58) Field of Classification Search
None
See application file for complete search history.

(56) References Cited

U.S. PATENT DOCUMENTS 10,235,882 B1 * 3/2019 Aoude ............. G08G 1/096716
2014/0354684 A1 * 12/2014 Beckwith ........... G06K 9/00671
345/633

(Continued)

OTHER PUBLICATIONS

Zaki et al., "Exploring walking gait features for the automated recognition of distracted pedestrians," IET Intell. Transp. Syst., 2016, vol. 10, Iss. 2, pp. 106-113 (Year: 2016).*

(Continued)

*Primary Examiner* — Soo Shin
(74) *Attorney, Agent, or Firm* — Cantor Colburn LLP

(57) ABSTRACT

A method for identifying distracted pedestrians. The method includes determining operating conditions of a vehicle using a plurality of vehicle controllers. Pedestrian parameters for a pedestrian in a vicinity of the vehicle are acquired using a plurality of vehicle sensors. The pedestrian parameters include at least one of face positions, body positions, gait and hand gestures. Information related to an environment surrounding the vehicle is acquired. Pedestrian awareness level is determined based on the acquired pedestrian parameters and based on the information related to the environment surrounding the vehicle. A determination is made whether the pedestrian awareness level is below a predefined threshold. The pedestrian is classified as distracted, in response to determining that the pedestrian awareness level is below the predefined threshold.

20 Claims, 6 Drawing Sheets

(56) References Cited

U.S. PATENT DOCUMENTS

| | | | | |
|---|---|---|---|---|
| 2018/0268311 A1* | 9/2018 | Vasters | ............... | H04W 12/68 |
| 2018/0326982 A1* | 11/2018 | Paris | ............... | G05D 1/0088 |
| 2019/0259284 A1* | 8/2019 | Khadloya | ............... | G06T 7/97 |
| 2019/0266859 A1* | 8/2019 | Song | ............... | G05D 1/0248 |
| 2019/0351823 A1* | 11/2019 | Van Der Meijs | ...... | B60K 35/00 |
| 2020/0143177 A1* | 5/2020 | Naser | ............... | G06K 9/00805 |
| 2020/0380273 A1* | 12/2020 | Saez | ............... | H04W 4/40 |

OTHER PUBLICATIONS

Rangesh et al., "Pedestrians and their Phones—Detecting Phone-based Activities of Pedestrians for Autonomous Vehicles," 2016 IEEE 19th International Conference on Intelligent Transportation Systems (ITSC) Windsor Oceanico Hotel, Rio de Janeiro, Brazil, Nov. 1-4, 2016 (Year: 2016).*

Kooij et al., "Context-Based Pedestrian Path Prediction," In: D. Fleet et al. (Eds.): ECCV 2014, Part VI, LNCS 8694, pp. 618-633, 2014. (Year: 2014).*

Hashimoto et al., "Probability Estimation for Pedestrian Crossing Intention at Signalized Crosswalks," Proceedings of the 2015 IEEE International Conference on Vehicular Electronics and Safety, Yokohama, Japan. Nov. 5-7, 2015. (Year: 2015).*

Roth et al., "Driver and Pedestrian Awareness-based Collision Risk Analysis," 2016 IEEE Intelligent Vehicles Symposium (IV), Gothenburg, Sweden, Jun. 19-22, 2016 (Year: 2016).*

\* cited by examiner

IDENTIFICATION OF DISTRACTED PEDESTRIANS

INTRODUCTION

The subject disclosure relates to systems and methods for detecting and obtaining information about objects around a vehicle, and more particularly relates to a multimodal vehicle-to-pedestrian notification system.

The travel of a vehicle along predetermined routes, such as on highways, roads, streets, paths, etc. can be affected by other vehicles, objects, obstructions, and pedestrians on, at or otherwise in proximity to the path. The circumstances in which a vehicle's travel is affected can be numerous and diverse. Vehicle communication networks using wireless technology have the potential to address these circumstances by enabling vehicles to communicate with each other and with the infrastructure around them. Connected vehicle technology (e.g., Vehicle to Vehicle (V2V) and Vehicle to Infrastructure (V2I)) can alert motorists of roadway conditions. Connected vehicles can also "talk" to traffic signals, work zones, toll booths, school zones, and other types of infrastructure. Further, using either in-vehicle or after-market devices that continuously share important mobility information, vehicles ranging from cars to trucks and buses to trains will be able to "talk" to each other and to different types of roadway infrastructure. In addition to improving inter-vehicle communication, connected V2V and V2I applications have the potential to impact broader scenarios, for example, Vehicle to Pedestrian (V2P) communication.

Accordingly, it is desirable to utilize V2P communication to improve pedestrian safety.

SUMMARY

In one exemplary embodiment described herein is a method for identifying distracted pedestrians in a vicinity of a vehicle. The method includes determining operating conditions of the vehicle using a plurality of vehicle controllers. Pedestrian parameters for a pedestrian in the vicinity of the vehicle are acquired using a plurality of vehicle sensors. The pedestrian parameters include at least one of face positions, body positions, gait and hand gestures. Information related to an environment surrounding the vehicle is acquired. A pedestrian awareness level is determined based on the acquired pedestrian parameters and based on the information related to the environment surrounding the vehicle. A determination is made whether the pedestrian awareness level is below a predefined threshold. The pedestrian is classified as distracted pedestrian, in response to determining that the pedestrian awareness level is below the predefined threshold.

In addition to one or more of the features described above, or as an alternative, further embodiments of the method may include that determining the pedestrian awareness level further includes estimating a pedestrian awareness state based on the acquired pedestrian parameters.

In addition to one or more of the features described above, or as an alternative, further embodiments of the method may include that determining the pedestrian awareness level further includes detecting a state transition triggering event. The state transition triggering event occurs when a change is detected in the pedestrian parameters indicating an awareness state transition from a first state to a second state.

In addition to one or more of the features described above, or as an alternative, further embodiments of the method may include that the pedestrian awareness level is determined using a learning model.

In addition to one or more of the features described above, or as an alternative, further embodiments of the method may include that determining the pedestrian awareness level further includes training the learning model based on a pedestrian behavior and estimating a probability of an aware pedestrian based on the acquired pedestrian parameters and based on the determined operating conditions.

In addition to one or more of the features described above, or as an alternative, further embodiments of the method may include that determining the pedestrian awareness level further includes estimating a probability of a focused pedestrian.

In addition to one or more of the features described above, or as an alternative, further embodiments of the method may include sending a notification to the distracted pedestrian.

In addition to one or more of the features described above, or as an alternative, further embodiments of the method may include that acquiring the information related to the environment surrounding the vehicle further includes identifying objects in the vicinity of the vehicle that indicate a likelihood of a pedestrian being outside of a field of sensing of the plurality of vehicle sensors.

In addition to one or more of the features described above, or as an alternative, further embodiments of the method may include that estimating the pedestrian awareness level further includes analyzing at least one of a pedestrian's gait, a pedestrian's line of sight, a pedestrian's posture and vehicle surrounding conditions.

In addition to one or more of the features described above, or as an alternative, further embodiments of the method may include that analyzing the pedestrian's line of sight further includes determining whether the vehicle is outside of the pedestrian's line of sight.

Also described herein is another embodiment that is a multimodal system of a vehicle for identifying distracted pedestrians. The multimodal system includes a plurality of vehicle sensors and a plurality of vehicle controllers disposed on a vehicle. The plurality of controllers is operable to obtain vehicle operating conditions and the plurality of sensors is operable to obtain information related to an environment surrounding the vehicle. The multimodal system also includes a vehicle information system operatively coupled to the plurality of vehicle sensors and to the plurality of vehicle controllers. The vehicle information system is configured to determine operating conditions of the vehicle using the plurality of vehicle controllers. Pedestrian parameters for a pedestrian in a vicinity of the vehicle are acquired using the plurality of vehicle sensors. The pedestrian parameters include at least one of face positions, body positions, gait and hand gestures. The information related to the environment surrounding the vehicle is acquired. A pedestrian awareness level is determined based on the acquired pedestrian parameters and based on the information related to the environment surrounding the vehicle. A determination is made whether the pedestrian awareness level is below a predefined threshold. The pedestrian is classified as distracted pedestrian, in response to determining that the pedestrian awareness level is below the predefined threshold.

In addition to one or more of the features described above, or as an alternative, further embodiments of the system may include that the vehicle information system configured to determine the pedestrian awareness level is further configured to estimate the pedestrian awareness level based on the acquired pedestrian parameters.

In addition to one or more of the features described above, or as an alternative, further embodiments of the system may include that the vehicle information system configured to determine the pedestrian awareness level is further configured to detect a state transition triggering event. The state transition triggering event occurs when a change is detected in the pedestrian parameters indicating an awareness state transition from a first state to a second state.

In addition to one or more of the features described above, or as an alternative, further embodiments of the system may include that the pedestrian awareness level is determined using a learning model.

In addition to one or more of the features described above, or as an alternative, further embodiments of the system may include that the vehicle information system configured to determine the pedestrian awareness level is further configured to train the learning model based on a pedestrian behavior and estimate a probability of an aware pedestrian based on the acquired pedestrian parameters and based on the determined operating conditions.

In addition to one or more of the features described above, or as an alternative, further embodiments of the system may include that the vehicle information system configured to determine the pedestrian awareness level is further configured to estimate a probability of a focused pedestrian.

In addition to one or more of the features described above, or as an alternative, further embodiments of the system may include that the vehicle information system is further configured to send a notification to the distracted pedestrian.

In addition to one or more of the features described above, or as an alternative, further embodiments of the system may include that the vehicle information system configured to acquire the information related to the environment surrounding the vehicle is further configured to identify objects in the vicinity of the vehicle that indicate a likelihood of a pedestrian being outside of a field of sensing of the plurality of vehicle sensors.

In addition to one or more of the features described above, or as an alternative, further embodiments of the system may include that the vehicle information system configured to estimate pedestrian awareness level is further configured to analyze at least one of a pedestrian's gait, a pedestrian's line of sight, a pedestrian's posture and vehicle surrounding conditions.

In addition to one or more of the features described above, or as an alternative, further embodiments of the system may include that the vehicle information system configured to analyze the pedestrian's line of sight is further configured to determine whether the vehicle is outside of the pedestrian's line of sight.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
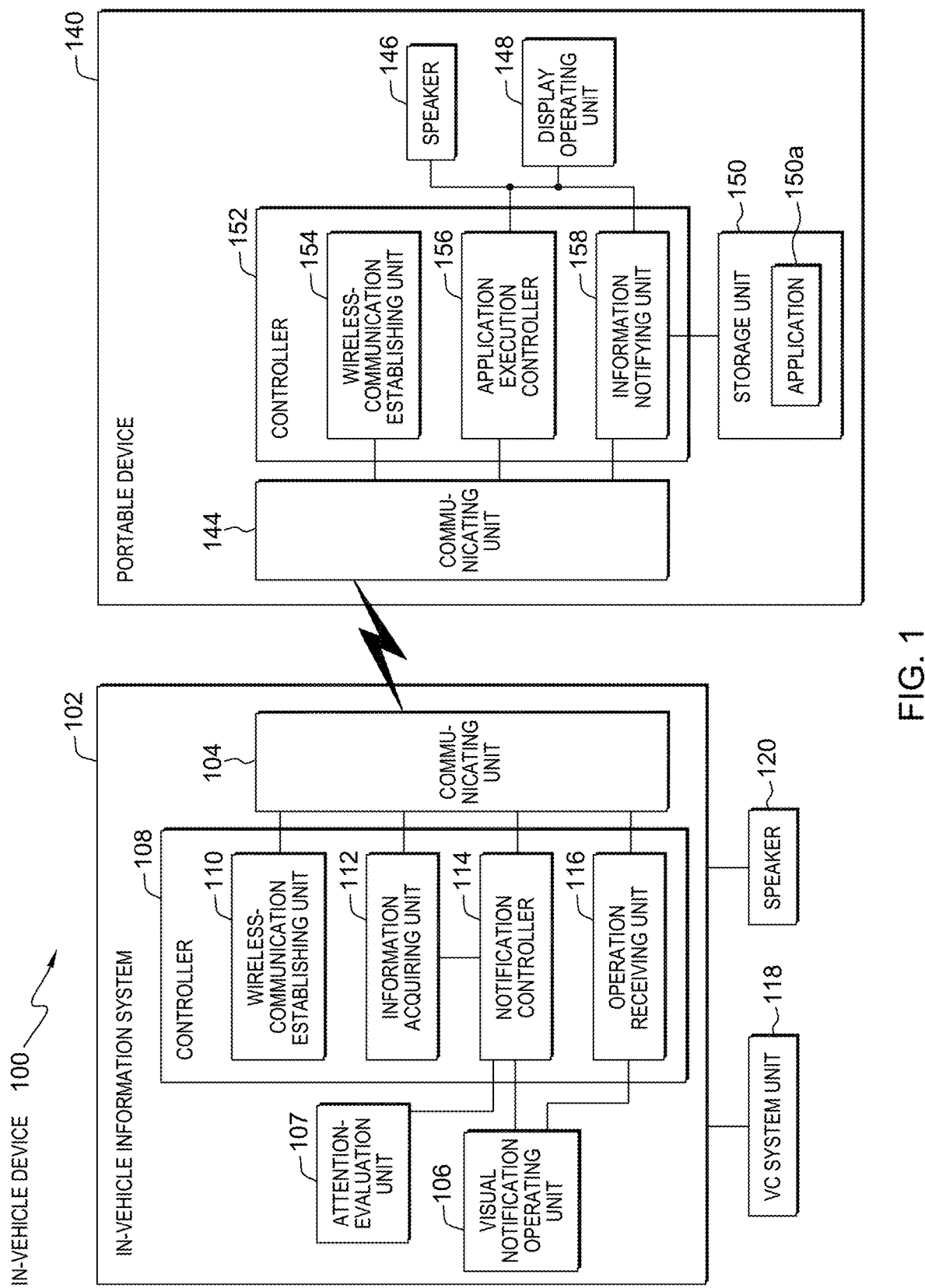
FIG. 1 is a block diagram of a configuration of an in-vehicle information system in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The following discussion generally relates to a system for detecting and identifying distracted pedestrians around a vehicle. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to vehicle information systems, V2P communication, automotive exteriors and the like need not be described in detail herein.

In accordance with an exemplary embodiment described herein is an in-vehicle information system and a method of using a multimodal communication system for detecting and identifying pedestrians who may be too distracted, inattentive, or otherwise unaware to notice the operational mode of a nearby vehicle. In an embodiment, to construct a model of the environment surrounding the corresponding vehicle, the in-vehicle information system collects data from a variety of sensors (e.g., light detection and ranging (LIDAR), monocular or stereoscopic cameras, radar, and the like) that are mounted to at least one end of the vehicle and analyzes this data to determine the positions and motion properties of relevant objects (obstacles) in the environment. The term "relevant objects" is used herein broadly to include, for example, other vehicles, cyclists, pedestrians, and animals. (There may also be objects in the environment that are not relevant, such as small roadside debris, vegetation, poles, curbs, traffic cones, and barriers.) In an embodiment, the in-vehicle information system may also rely on infrastructure information gathered by vehicle-to-infrastructure communication.

FIG. 1 is a block diagram of a configuration of an in-vehicle information system in accordance with an exemplary embodiment. As illustrated in FIG. 1, because an in-vehicle device 100 includes an in-vehicle information system 102 which communicates with a pedestrian's portable device 140, the respective devices are explained.

A configuration of in-vehicle information system 102 is explained first. As illustrated in FIG. 1, the in-vehicle information system 102 includes a communicating unit 104, a visual notification operating unit 106, and a controller 108, and is connected to a vehicle control system (hereinafter, "VC system") unit 118 and an audio speaker or buzzer system 120.

The VC system unit 118 is connected to the in-vehicle information system 102 and includes various sensors that detect a state of the vehicle, such as a vehicle speed sensor, an acceleration sensor, a steering sensor, a brake sensor, and an indicator sensor, to detect speed of the vehicle (car speed), acceleration of the vehicle, positions of tires of the vehicle, an operation of the indicator, and a state of the brake. Also, the VC system unit 118 may include lower-level controllers. In some embodiments, the lower level controllers may be, for example, single-input-single-output (SISO) controllers such as proportional-integral-derivative (PID) controllers. The audio speaker or buzzer system 120 outputs an audio notification, as described herein.

Returning to the configuration of the in-vehicle information system 102, once a distracted pedestrian or another relevant object is detected, the communicating unit 104 establishes a communication link with the pedestrian's portable device 140, for example, by using short-distance wireless communication such as Bluetooth. The communicating unit 104 facilitates communication between the in-vehicle information system 102 and the portable device 140 by using the established communication link. Bluetooth is a short-distance wireless-communications standard to perform wireless communication in a radius of about dozens of meters by using a frequency band of 2.4 gigahertz. Bluetooth is widely applied to electronic devices such as mobile telephones and personal computers.

In accordance with the exemplary embodiment, while a case that communication between the in-vehicle information system 102 and the portable terminal 140 is performed by using Bluetooth is explained, other wireless communications standard such as Wi-Fi and ZigBee can be also used. Alternatively, wireless messaging communication can be also be performed between the in-vehicle information system 102 and the portable device 140.

The visual notification operating unit 106 is connected to the controller 108, and also connected to a vehicle exterior ground projection system via a notification controller 114 in the controller 108. The visual notification operating unit 106 controls visual notifications described below.

The controller 108 includes an internal memory for storing a control program such as an operating system (OS), a program specifying various process procedures and required data, and also includes a wireless-communication establishing unit 110, an information acquiring unit 112, the notification controller 114, and an operation receiving unit 116 to perform various types of processes by these units.

When having detected a portable device of a pedestrian positioned at a predetermined distance allowing wireless communication with the in-vehicle information system 102, the wireless-communication establishing unit 110 establishes wireless communication with the detected portable device 140. Specifically, when the power of the in-vehicle device 100 is turned on, the wireless-communication establishing unit 110 activates the communicating unit 104, and searches whether there is a terminal in an area allowing wireless communication. When the portable device 140 enters an area allowing wireless communication, the wireless-communication establishing unit 110 detects the approaching portable device 140, and performs a pairing process using the communicating unit 104 with respect to the detected portable device 140, thereby establishing wireless communication with the portable device 140.

The information acquiring unit 112 acquires various types of data provided by various sensors and various vehicle controllers. Specifically, the information acquiring unit 112 acquires, for example, vehicle operating conditions, V2V information and V2I information described in greater detail herein.

An attention-evaluation unit 107 analyzes received data to determine pedestrian's awareness of the environment. The pedestrian's awareness may be determined using a learning model based on the acquired pedestrian parameters and may be compared to a predefined threshold. The learning model may be trained based on pedestrian behavior. In one embodiment, the learning model is configured to estimate a probability of an aware pedestrian based on the acquired pedestrian parameters and based on the environment information. In some examples, the pedestrian can be presumed to be aware of vehicles that they have looked at, for example as determined by gaze tracking. However, there may be vehicles at which a pedestrian has looked, about which the pedestrian needs additional warnings because the pedestrian does not appear to have properly predicted that vehicle's current movements and/or state. Attention-evaluation unit 107 allows notification controller 114 warnings/notifications to be given selectively for pedestrians within the environment that have been classified as distracted.

When having detected the distracted pedestrian, the notification controller 114 selects one of the available communication modes and renders pedestrian notification via at least one of the visual notification operating unit 106 and the audio speaker or buzzer system 120. Specifically, the notification controller 114 may instruct the visual notification operating unit 106 to output a visual warning to the distracted pedestrian using a spotlight or a laser projection system discussed herein. Further, in some embodiments, the notification controller 114 selects to output a notification audio signal from the audio speaker or buzzer system 120.

A configuration of the pedestrian's portable device 140 is explained next. In various embodiments, the portable device 140 may include but is not limited to any of the following: a smart watch, digital computing glasses, a digital bracelet, a mobile internet device, a mobile web device, a smartphone, a tablet computer, a wearable computer, a head-mounted display, a personal digital assistant, an enterprise digital assistant, a handheld game console, a portable media player, an ultra-mobile personal computer, a digital video camera, a mobile phone, a personal navigation device, and the like. As illustrated in FIG. 1, the exemplary portable device 140 may include a communicating unit 144, a speaker 146, a haptic notification control unit 147, a display operating unit 148, a storage unit 150, and a controller 152.

The communicating unit 144 establishes a communication link with the in-vehicle information system 102 by using, for example, the short-distance wireless communication such as Bluetooth as in the communicating unit 104 of the in-vehicle information system and performs communication between the portable device 140 and the in-vehicle information system by using the established communication link.

The haptic notification control unit 147 is configured to generate haptic notifications. Haptics is a tactile and force feedback technology that takes advantage of a user's sense of touch by applying haptic feedback effects (i.e., "haptic effects" or "haptic feedback"), such as forces, vibrations, and motions, to the user. The portable device 140 can be configured to generate haptic effects. In general, calls to embedded hardware capable of generating haptic effects can be programmed within an operating system ("OS") of the device portable device 140. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware of the haptic notification control unit 147 then produces the appropriate haptic effect.

Upon reception of the notification signal/message from application execution controller 156 or information notifying unit 158 in the controller 152 described herein, the display operating unit 148, which may include an input/output device such as a touch panel display, displays a text or an image received from the application execution controller 156 or the information notifying unit 158 in the controller 152.

The storage unit 150 stores data and programs required for various types of processes performed by the controller 152, and stores, for example, an application 150*a* to be read and executed by the application execution controller 156. The application 150*a* is, for example, the navigation application, a music download application, or a video distribution application.

The controller 152 includes an internal memory for storing a control program such as an operating system (OS), a program specifying various process procedures, and required data to perform processes such as audio communication, and also includes a wireless-communication establishing unit 154, the application execution controller 156, and the information notifying unit 158 to perform various types of processes by these units.

A wireless-communication establishing unit 154 establishes wireless communication with the in-vehicle information system 102. Specifically, when a pairing process or the like is sent from the in-vehicle information system 102 via the communicating unit 144, the wireless-communication establishing unit 154 transmits a response with respect to the process to the in-vehicle information system 102 to establish wireless communication.

The application execution controller 156 receives an operation instruction from a user of the portable device 140, and reads an application corresponding to the received operation from the storage unit 150 to execute the application. For example, upon reception of an activation instruction of the navigation application from the user of the portable device 140, the application execution controller 156 reads the navigation application from the storage unit 150 to execute the navigation application.

Figure 2A:
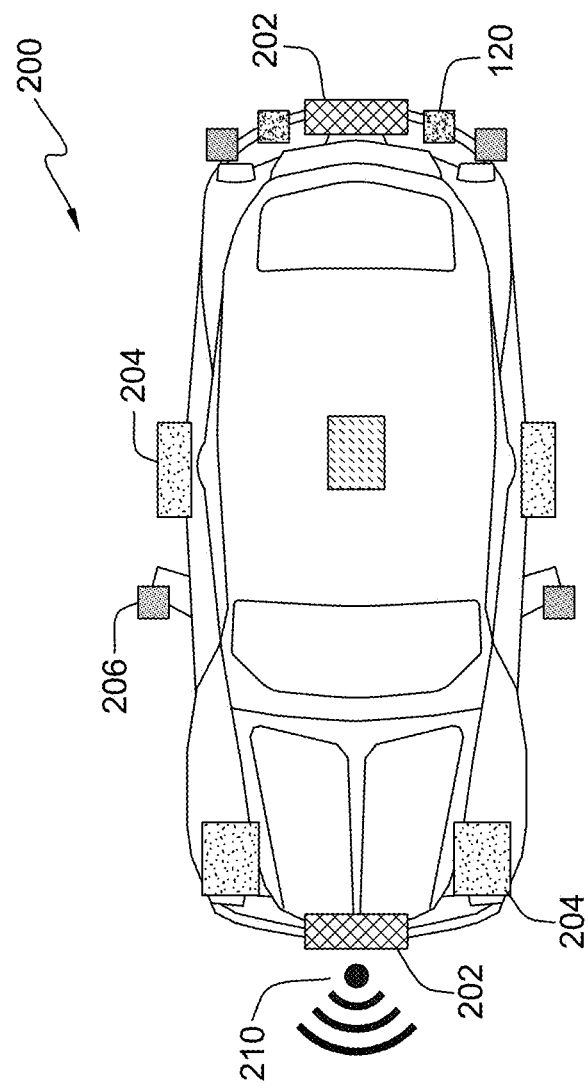
FIG. 2A is an example diagram of a vehicle having equipment for notifying distracted pedestrians in accordance with an exemplary embodiment.
Figure 2A:
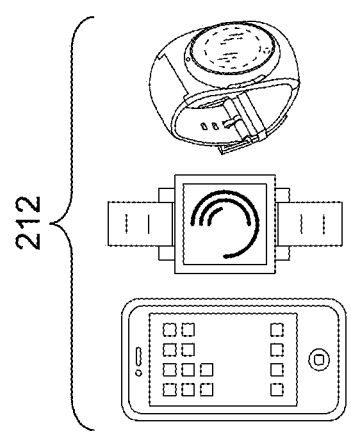

Referring to the exemplary automobile 200 illustrated in FIG. 2A, vehicular equipment coupled to the automobile 200 generally provides various modes of communicating with distracted pedestrians. As shown, the exemplary automobile 200 may include an exterior projection system, such as, one or more laser projection devices 202, other types of projection devices 206, spotlight digital projectors 204, and the like. The exemplary automobile may further include the audio speaker or buzzer system 120 and wireless communication devices 210. In an embodiment, the in-vehicle information system 102 (not shown in FIG. 2A) employs the vehicle exterior projection system to project highly targeted images, pictures, spotlights and the like to improve safety of all relevant objects around the vehicle 200.

Still referring to the exemplary automobile 200 illustrated in FIG. 2A, the vehicle exterior ground projection system may include one or more projection devices 202, 206 (including laser projection devices 202) coupled to automobile 200 and configured to project an image onto a display surface that is external to automobile 200. The display surface may be any external surface. In one embodiment, the display surface is a region on the ground adjacent the automobile, or anywhere in the vicinity of the vehicle; in front, back, the hood, and the like.

The projected image may include any combination of images, pictures, video, graphics, alphanumerics, messaging, test information, other indicia relating to safety of relevant objects (e.g., distracted pedestrians) around vehicle 200. FIG. 2C is an example of a visual notification projected by laser projection devices 202 to notify all relevant objects of potential safety concerns in accordance with an exemplary embodiment. In various embodiments, in-vehicle information system 102 coupled with the vehicle exterior projection system may project images and render audible information associated with the vehicle's trajectory, and operation. For example, providing a visual and audible indication that vehicle 200 is moving forward, backward, door opening, "Turning Left" and the like, as well as illuminating the intended path of the vehicle. Exemplary image 220 (as shown in FIG. 2C) may include a notification to a passing pedestrian or cyclist. For example, image 220 displayed in the front or rear of vehicle 200 (as shown in FIG. 2C) may illuminate and indicate the intended trajectory of vehicle 200. In various embodiments, the graphics used for visual notification can change dynamically based on the speed of vehicle 200, vehicle operating mode and context, current and predicted direction of travel of the vehicle 200, objects around the vehicle 200 and the like.

According to an embodiment, the vehicle exterior projection system may further include at least one spotlight digital projector 204 coupled to vehicle 200. Preferentially, a spotlight digital projector 204 is aligned in order to project a spotlight so that said spotlight is visible to the relevant objects when it strikes a suitable projection surface. Such a projection surface will generally be located outside of the motor vehicle 200; more preferably it can be a roadway surface, a wall or the like. Practically, at least one headlamp and/or at least one rear spotlight of vehicle 200 can be designed as a spotlight digital projector 204 in order to render the spotlight visible on a surface lit up by headlamp/spotlight projector 204.

As shown in FIG. 2A, spotlight digital projectors 204 may be located at different sides of vehicle 200. In one embodiment, visual notification operating unit 106 can be practically set up to select spotlight digital projector 204 on the right side of vehicle 200 for projecting the spotlight when the distracted pedestrian is detected on the right side of vehicle 200, and to select spotlight digital projector 204 on the left side of vehicle 200 when the distracted pedestrian is detected on the left side of vehicle 200. Thus, the probability is high that the spotlight in each case is visible in the direction in which the distracted pedestrian is looking.

Figure 2B:
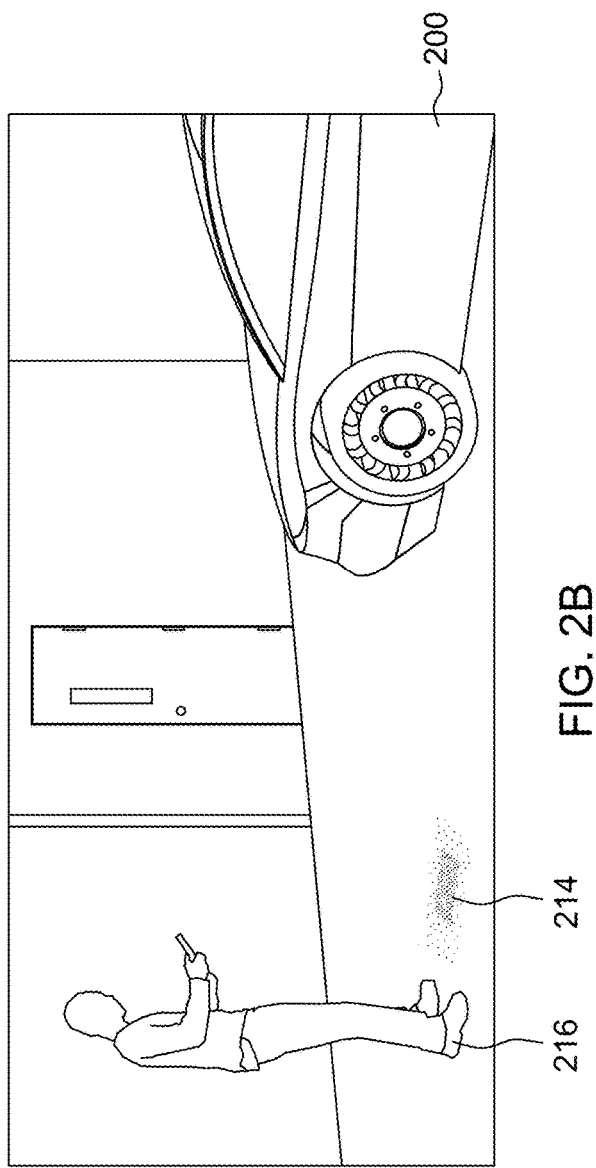
FIG. 2B is an example diagram illustrating visual notification in accordance with an exemplary embodiment.
Figure 2C:
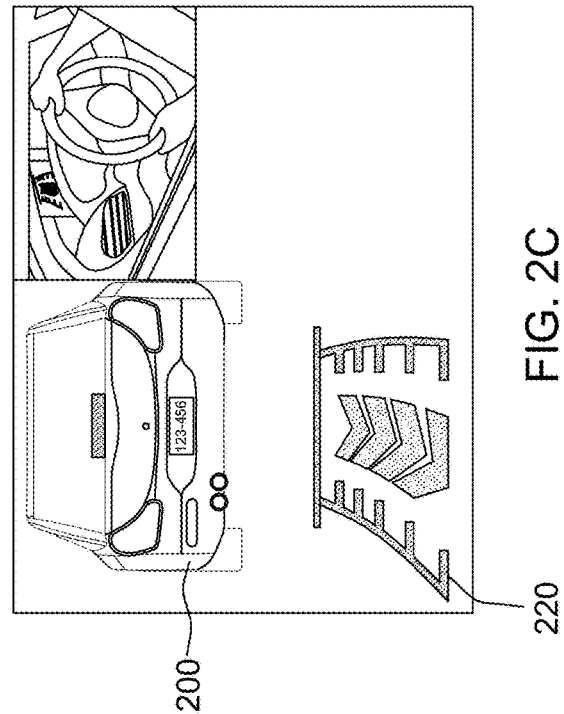
FIG. 2C is an example diagram illustrating alternative visual notification in accordance with an exemplary embodiment.

FIG. 2B is an example of a visual notification in a form of spotlight image 214 projected by spotlight digital projector 204. Spotlight image 214 shown in FIG. 2B indicates to distracted pedestrian 216 (or any other relevant object) the safe distance to vehicle 200. In one embodiment, visual notification operating unit 106 can determine a desirable location of the projected spotlight image based on the relative position of detected pedestrian 216. In other words, visual notification operating unit 106 is capable of moving the position of the visual notification spotlight image to actively track the position of the pedestrian.

Referring again to exemplary automobile 200 illustrated in FIG. 2A, in various embodiments, in-vehicle information system 102 may further render audible information associated with the vehicle's trajectory, and operation to alert relevant objects to the presence of moving vehicle 200. In one embodiment, audio speaker or buzzer system 120 may be coupled to vehicle 200. Such audio speaker or buzzer system 120 may be used by in-vehicle information system 102 to notify relevant objects of a possible collision situation. Audio speaker or buzzer system 120 may be activated independently of the vehicle exterior projection system. In some embodiments, if in-vehicle information system 102 establishes a communication session with pedestrian's portable device 140 and determines that distracted pedestrian 216 (shown in FIG. 2B) is listening to music, simultaneously with activating audio speaker or buzzer system 120, notification controller 114 may send instructions to controller 152 of the pedestrian's portable device 140 to temporarily mute or turn off the music. It should be noted that various notification modes discussed herein can be used separately or in any combination, including the use of all three notification modes (image projection, spotlight projection and audible notifications).

According to an embodiment, in-vehicle information system 102 (shown in FIG. 1) may also be coupled to one or more wireless communication devices 210. Wireless communication device 210 may include a transmitter and a receiver, or a transceiver of the vehicle 200. Wireless communication device 210 may be used by communicating unit 104 of the in-vehicle information system 102 (shown in FIG. 1) to establish a communication channel between vehicle 200 and the pedestrian's portable device 140. The communication channel between portable device 140 and vehicle 200 may be any type of communication channel, such as, but not limited to, dedicated short-range communications (DSRC), Bluetooth, WiFi, Zigbee, cellular, WLAN, etc. The DSRC communications standard supports communication ranges of 400 meters or more.

Figure 3:
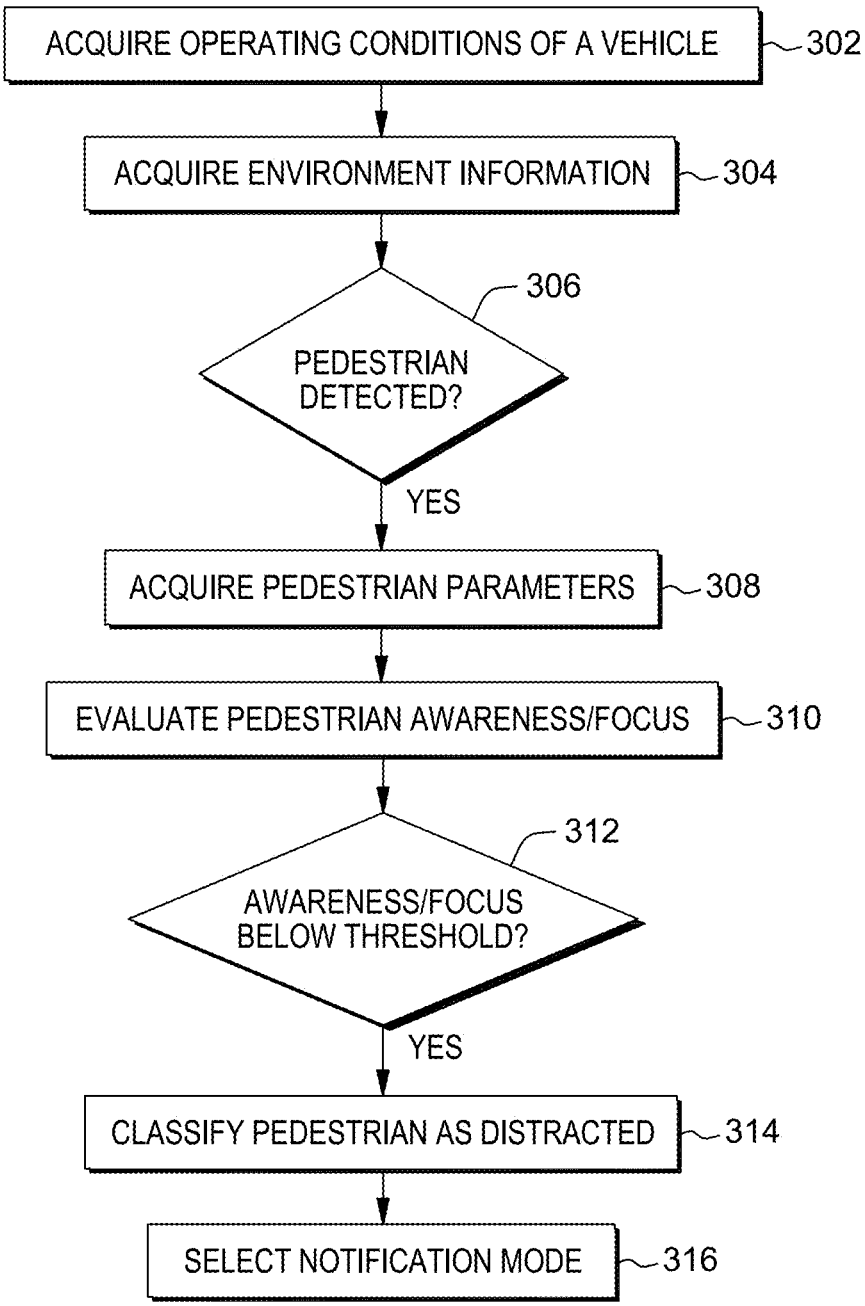
FIG. 3 is a flowchart of a process that may be employed for implementing one or more exemplary embodiments.

Referring to FIG. 3, there is shown a flowchart 300 of a process that may be employed for implementing one or more exemplary embodiments. At block 302, information acquiring unit 112 determines operating conditions of the vehicle 200. Vehicle operating conditions may include, but are not limited to, engine speed, vehicle speed, ambient temperature. Further, operating conditions may include selecting a route to a destination based on driver input or by matching a present driving route to driving routes taken during previous trips. The operating conditions may be determined or inferred from a plurality of sensors and/or a plurality of controllers employed by VC system unit 118.

At block 304, information acquiring unit 112 also takes advantage of other sources, external to vehicle 200, to collect information about the environment. The use of such sources allows information acquiring unit 112 to collect information that may be hidden from the plurality of sensors (e.g., information about distant objects or conditions outside the range of sensors), and/or to collect information that may be used to confirm (or contradict) information obtained by the plurality of controllers. For example, in-vehicle information system 102 may include one or more interfaces (not shown in FIG. 1) that are configured to receive wireless signals using one or more "V2X" technologies, such as V2V and V2I technologies. In an embodiment in which in-vehicle information system 102 is configured to receive wireless signals from other vehicles using V2V, for example, information acquiring unit 112 may receive data sensed by one or more sensors of one or more other vehicles, such as data indicating the configuration of a street, or the presence and/or state of a traffic control indicator, etc. In an example embodiment in which in-vehicle information system 102 is configured to receive wireless signals from infrastructure using V2I, information acquiring unit 112 may receive data provided by infrastructure elements having wireless capability, such as dedicated roadside stations or "smart" traffic control indicators (e.g., speed limit postings, traffic lights, etc.), for example. The V2I data may be indicative of traffic control information (e.g., speed limits, traffic light states, etc.), objects or conditions sensed by the stations, or may provide any other suitable type of information (e.g., weather conditions, traffic density, etc.). In-vehicle information system 102 may receive V2X data simply by listening/scanning for the data or may receive the data in response to a wireless request sent by in-vehicle information system 102, for example. More generally, in-vehicle information system 102 may be configured to receive information about external objects and/or conditions via wireless signals sent by any capable type of external object or entity, such as an infrastructure element (e.g., a roadside wireless station), a commercial or residential location (e.g., a locale maintaining a WiFi access point), etc.

At least in some embodiments, at block 304, information acquiring unit 112 may scan the environmental scene around vehicle 200 using one or more sensors. One such sensor is a light detection and ranging (LIDAR) device. A LIDAR device actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The LIDAR device can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

At block 306, information acquiring unit 112 processes and analyzes images and other data captured by scanning the environment to identify objects and/or features in the environment surrounding vehicle 200. The detected features/objects can include traffic signals, road way boundaries, other vehicles, pedestrians, and/or obstacles, etc. In some embodiments, information acquiring unit 112 may identify objects in the vicinity of the vehicle that indicate a likelihood of a pedestrian being outside of a field of sensing of the one or more of vehicle sensors Information acquiring unit 112 can optionally employ an object recognition algorithm, a Structure From Motion (SFM) algorithm, video tracking, and/or available computer vision techniques to effect categorization and/or identification of detected features/objects. In some embodiments, information acquiring unit 112 can be additionally configured to differentiate between pedestrians and other detected objects and/or obstacles. In one exemplary embodiment, portable device 140 may be a V2P communication device. Accordingly, at block 306, wireless communication establishing unit 110 may receive a message from a pedestrian equipped with a V2P device. In one embodiment, the message received at block 306 may simply include an indication that there is a pedestrian in the vicinity of vehicle 200.

Responsive to detecting a pedestrian (decision block 306, "Yes" branch), at block 308, information acquiring unit 112 acquires one or more pedestrian parameters, such as the GPS coordinates of the pedestrian, the heading, speed or movement pattern of the pedestrian, gait, body positions, face positions, hand gestures or other like parameters. For example, information acquiring unit 112 may receive information related to awareness focus (e.g. gaze direction) over a predetermined time period. Hence, the pedestrian parameters may include gaze track data for the pedestrian.

According to an embodiment, at block 310, attention-evaluation unit 107 evaluates the pedestrian's awareness/focus to determine if pedestrian notification is necessary. Functionality of the attention-evaluation unit 107 is described herein in conjunction with FIG. 4. For example, attention-evaluation unit 107 may use the parameters acquired at block 308 to evaluate pedestrian awareness/focus. Evaluation of the pedestrian's attention may include determining the pedestrian's distraction level by estimating a pedestrian awareness state based on the acquired pedestrian parameters. Steps performed at block 310 may include performing the analysis using a trained learning model, such as a trained HMM, for example, as discussed herein in conjunction with FIGS. 4 and 5. For example, if a combination of multiple variables associated with the evaluated pedestrian are predicted to have a state that indicates lack of awareness/focus, the steps at block 310 may include estimating a probability of an aware pedestrian and/or estimating a probability of a focused pedestrian. In addition, at block 310, attention-evaluation unit 107 may determine whether the determined probability of awareness and focus of the pedestrian are below a predefined threshold.

Responsive to determining that a probability of the pedestrian's awareness/focus is below a predefined threshold (decision block 312, "Yes" branch), at block 314, attention-evaluation unit 107 classifies the pedestrian being evaluated as a distracted pedestrian and sends information identifying the distracted pedestrian, as well as information related to the pedestrian's awareness state to notification controller 114. If no pedestrian is detected (decision block 306, "No" branch) or, in response to determining that pedestrian's awareness/focus is above the predefined threshold (decision block 312, "No" branch), the process returns to block 302.

Once notification controller 114 receives the distracted pedestrian's information, at block 316, notification controller 114 selects a particular mode of pedestrian notification. In various embodiments, alternative modes of notification can include, but are not limited to, communication via tactile, audio, visual, portable device and the like. For example, notification controller 114 may first select visual communication, such as spotlight projection. Furthermore, at block 316, notification controller 114 notifies the pedestrian using the selected mode of notification. For example, notification controller 114 may engage visual notification operating unit 106 to project spotlight image 214 (as shown in FIG. 2B) using spotlight digital projector 204 to notify a distracted pedestrian (like pedestrian 216 in FIG. 2B) of a potential collision with the vehicle in accordance with an exemplary embodiment.

Figure 4:
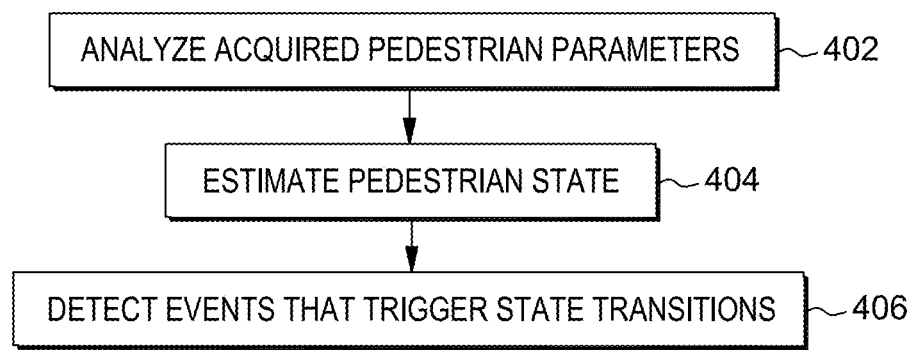
FIG. 4 is a flowchart of an evaluation process to determine a pedestrian's awareness and/or focus in accordance with an exemplary embodiment.

FIG. 4 is a flowchart 400 of an evaluation process to determine a pedestrian's awareness and/or focus in accordance with an exemplary embodiment. Attention-evaluation unit 107 uses the parameters acquired at block 308 (shown in FIG. 3) to evaluate pedestrian awareness/focus. Evaluation of a pedestrian's attention may include determining the pedestrian's distraction level by estimating a pedestrian awareness state based on the acquired pedestrian parameters. For example, if a combination of multiple variables associated with the evaluated pedestrian are predicted to have a state that indicates lack of awareness/focus, the steps at block 310 may include estimating a probability of an aware pedestrian and/or estimating a probability of a focused pedestrian. In addition, at block 310, attention-evaluation unit 107 may determine whether the determined probability of awareness and focus of the pedestrian are below a predefined threshold. At block 402, attention-evaluation unit 107 analyzes the acquired pedestrian parameters. This step may include analysis of a plurality of images to detect a pedestrian's gait. This analysis may further include step detection and gait direction estimation. During stable forward gait, even steps will be to one side of the forward direction and odd steps will be to the other. These two directions can then be averaged together to find the forward direction. Various clustering techniques (e.g., neural networks) may be used to classify gait into two or more classes. This classification may be used to compute the relative direction of movement.

In addition, at block 402, attention-evaluation unit 107 may analyze a pedestrian's line of sight. For example, a very aware pedestrian may have broad sight; therefore, he/she can extensively perceive a vehicle that may cross his/her path. Meanwhile, a less aware pedestrian may have narrow sight; therefore, he/she may have difficulty in perceiving a vehicle existing in peripheral vision off the center of his/her field of view (central vision). (Or, the pedestrian cannot perceive it at all.) In one embodiment, attention-evaluation unit 107 may analyze a plurality of images of a pedestrian to determine if the vehicle is outside of the sightline of the analyzed pedestrian.

Furthermore, at block 402, attention-evaluation unit 107 may also detect a pedestrian's posture. The postures of the pedestrian may include at least one of an orientation of the pedestrian, an angle between legs, a relation between hands and legs, a static, walking, or running state, and a pedestrian's height. Based on the pedestrian's posture it is possible to quickly and somewhat accurately estimate the pedestrian's awareness state.

Figure 5:
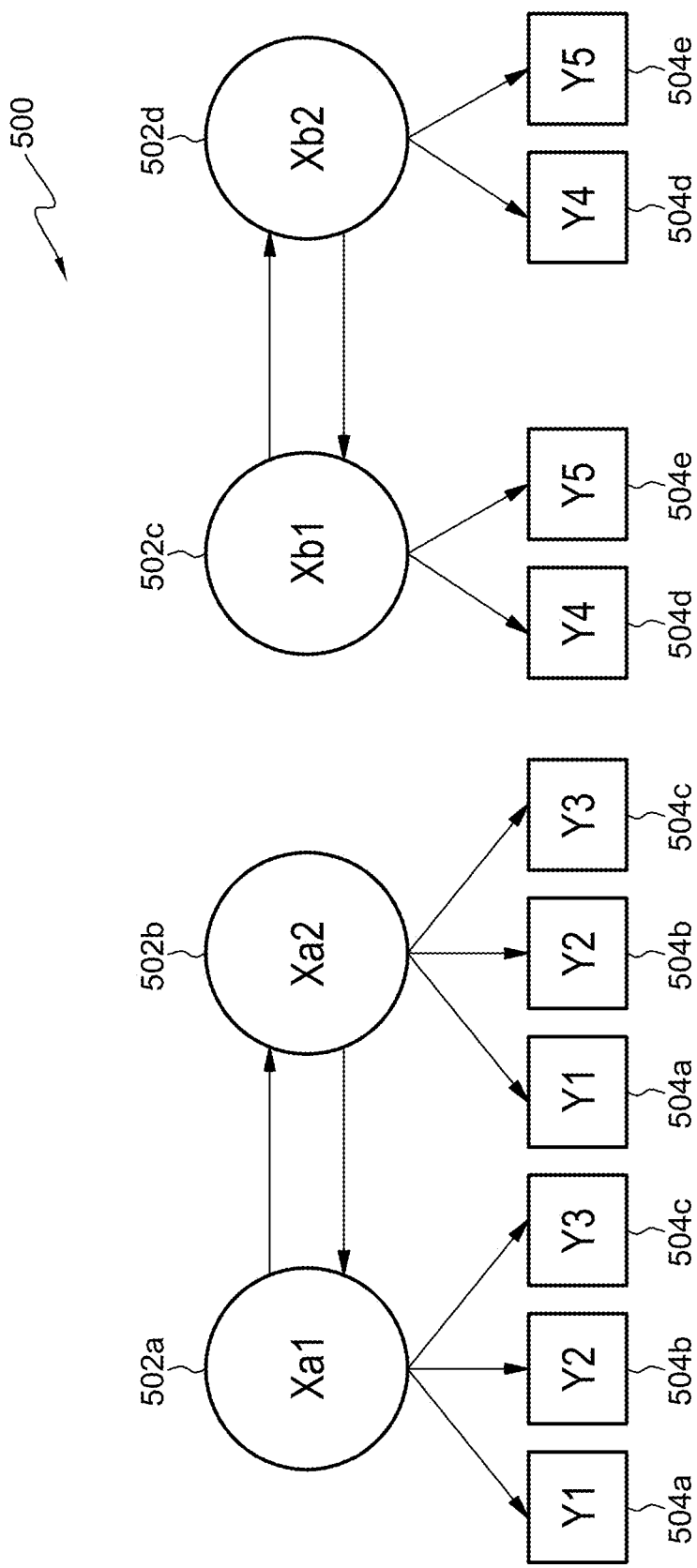
FIG. 5 is a diagram of an exemplary evaluation method for determining a pedestrian's awareness and/or focus using a trained Hidden Markov Model (HMM) based model.

According to an embodiment, at block 404, attention-evaluation unit 107 estimates a pedestrian's awareness state. In one embodiment, discrete states may include, but are not limited to, aware, unaware, distracted, focused. In one embodiment, attention-evaluation unit 107 may rely on probabilistic techniques shown in FIG. 5. As shown in FIG. 5, a Hidden Markov Model (HMM) 500 is a probabilistic model composed of a number of interconnected states 502a, b, c and d and a directed graph. Each of the interconnected states 502a, b, c and d is associated with a subset of variables 504a, b, c, d and e. In one exemplary embodiment, variables 504a, b, c, d and e may include but are not limited to, a pedestrian's face position, a pedestrian's acceleration, a pedestrian's (hand) gesture state, a pedestrian's body position, a pedestrian's gait change and the like.

An HMM is a well-known statistical model and may be considered as a simplified dynamic Bayesian network which is a probabilistic graphical model that represents a set of variables and their causal influences or probabilistic dependencies. The state of a hidden Markov model is not directly visible. However, variables influenced by the state are visible. Each state has a probability distribution over the possible output tokens. Therefore, the sequence of tokens generated by an HMM gives some information about the sequence of states. Under this hidden Markov model approach to the pedestrian's awareness state estimation, various well-known recursive or non-recursive Bayesian estimation techniques can be applied to perform the awareness state estimation. Recursive Bayesian estimation is a general probabilistic approach for performing "online" estimates of an unknown probability density function. A suitable recursive Bayesian filter for such online processing can be used to estimate the hidden states (e.g., the head motion of a pedestrian) of this model recursively (or sequentially) in time. As an example, a sequential Bayesian filter can be used, in a probabilistic sense, to estimate these hidden states. As another example, an extended Kalman filter, a nonlinear filter, can also be used to estimate the hidden states.

Referring back to FIG. 4, at block 406, attention-evaluation unit 107 detects events that trigger awareness state transitions. According to an embodiment of the present invention, a state transition triggering event occurs when a change is detected in the pedestrian parameters indicating an awareness state transition from one state to another state. Typically, HMMs are capable of computing a probability of a state transition triggering event given a set of feature variables describing the event. However, HMMs need to be trained to calculate state transition probabilities. In an embodiment, state transition triggering events may occur when an event is detected. For example, a particular gesture from a pedestrian may trigger an awareness state transition. A sudden change in motion of a pedestrian is another example of a state transition triggering event.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for identifying distracted pedestrians in a vicinity of a vehicle, the method comprising:
    determining operating conditions of the vehicle using a plurality of vehicle controllers;
    acquiring pedestrian parameters for a pedestrian in the vicinity of the vehicle using a plurality of vehicle sensors, the pedestrian parameters including at least one of face positions, body positions, gait and hand gestures;
    acquiring information related to an environment surrounding the vehicle;
    determining a pedestrian awareness level based on the acquired pedestrian parameters and based on the information related to the environment surrounding the vehicle, wherein determining the pedestrian awareness level includes estimating a pedestrian awareness state;
    determining whether the pedestrian awareness level is below a predefined threshold;
    classifying the pedestrian as a distracted pedestrian, in response to determining that the pedestrian awareness level below the predefined threshold; and
    determining whether a change is detected based on the pedestrian parameters, the change indicating a transition between a first awareness state and a second awareness state.

2. The method of claim 1, wherein determining the pedestrian awareness level further comprises estimating a probability of the pedestrian being in an aware state, and classifying the pedestrian as the distracted pedestrian based on the probability being below a threshold probability.

3. The method of claim 2, wherein determining the pedestrian awareness level further comprises detecting a state transition triggering event, wherein the state transition triggering event occurs when the change is detected in the pedestrian parameters indicating an awareness state transition from the first awareness state to the second awareness state.

4. The method of claim 3, wherein the pedestrian awareness level is determined using a learning model.

5. The method of claim 4, wherein determining the pedestrian awareness level further comprises training the learning model based on a pedestrian behavior and estimating a probability of an aware pedestrian based on the acquired pedestrian parameters and based on the determined operating conditions.

6. The method of claim 4, wherein determining the pedestrian awareness level further comprises estimating a probability of a focused pedestrian.

7. The method of claim 1 wherein the probability of the pedestrian being in an aware state is determined based on a probabilistic model specifying a plurality of awareness states, each awareness state of the plurality of awareness states having a respective probability distribution.

8. The method of claim 1, wherein acquiring the information related to the environment surrounding the vehicle further comprises identifying objects in the vicinity of the vehicle that indicate a likelihood of a pedestrian being outside of a field of sensing of the plurality of vehicle sensors.

9. The method of claim 2, wherein estimating the pedestrian awareness level further comprises analyzing at least one of a pedestrian's gait, a pedestrian's line of sight, a pedestrian's posture and vehicle surrounding conditions.

10. The method of claim 9, wherein analyzing the pedestrian's line of sight further comprises determining whether the vehicle is outside of the pedestrian's line of sight.

11. A multimodal system of a vehicle for identifying distracted pedestrians, the multimodal system comprising:
    a plurality of vehicle sensors and a plurality of vehicle controllers disposed on a vehicle, the plurality of vehicle controllers operable to obtain vehicle operating conditions and the plurality of sensors operable to obtain information related to an environment surrounding the vehicle; and
    a vehicle information system operatively coupled to the plurality of vehicle sensors and to the plurality of vehicle controllers, the vehicle information system configured to:
        determine operating conditions of the vehicle using the plurality of vehicle controllers;
        acquire pedestrian parameters for a pedestrian in a vicinity of the vehicle using the plurality of vehicle sensors, the pedestrian parameters including at least one of face positions, body positions, gait and hand gestures;
        acquire the information related to the environment surrounding the vehicle;
        determine a pedestrian awareness level based on the acquired pedestrian parameters and based on the information related to the environment surrounding the vehicle, the pedestrian awareness level including a pedestrian awareness state;

determine whether the pedestrian awareness level is below a predefined threshold;

classify the pedestrian as distracted pedestrian, in response to determining that the pedestrian awareness level below the predefined threshold; and determine whether a change is detected based on the pedestrian parameters, the change indicating a transition between a first awareness state and a second awareness state.

12. The multimodal system of claim 11, wherein the vehicle information system configured to determine the pedestrian awareness level is further configured to estimate a probability of the pedestrian being in an aware state, and classify the pedestrian as the distracted pedestrian based on the probability being below a threshold probability.

13. The multimodal system of claim 12, wherein the vehicle information system configured to determine the pedestrian awareness level is further configured to detect a state transition triggering event, wherein the state transition triggering event occurs when the change is detected in the pedestrian parameters indicating an awareness state transition from the first awareness state to the second awareness state.

14. The multimodal system of claim 13, wherein the pedestrian awareness level is determined using a learning model.

15. The multimodal system of claim 14, wherein the vehicle information system configured to determine the pedestrian awareness level is further configured to train the learning model based on a pedestrian behavior and estimate a probability of an aware pedestrian based on the acquired pedestrian parameters and based on the determined operating conditions.

16. The multimodal system of claim 14, wherein the vehicle information system configured to determine the pedestrian awareness level is further configured to estimate a probability of a focused pedestrian.

17. The multimodal system of claim 11, wherein the probability of the pedestrian being in an aware state is determined based on a probabilistic model specifying a plurality of awareness states, each awareness state of the plurality of awareness states having a respective probability distribution.

18. The multimodal system of claim 11, wherein the vehicle information system configured to acquire the information related to the environment surrounding the vehicle is further configured to identify objects in the vicinity of the vehicle that indicate a likelihood of a pedestrian being outside of a field of sensing of the plurality of vehicle sensors.

19. The multimodal system of claim 12, wherein the vehicle information system configured to estimate the pedestrian awareness level is further configured to analyze at least one of a pedestrian's gait, a pedestrian's line of sight, a pedestrian's posture and vehicle surrounding conditions.

20. The multimodal system of claim 19, wherein the vehicle information system configured to analyze the pedestrian's line of sight is further configured to determine whether the vehicle is outside of the pedestrian's line of sight.

* * * * *